United States Patent [19]

Bae

[11] Patent Number: 5,373,453
[45] Date of Patent: Dec. 13, 1994

[54] CENTRALIZED APPARATUS FOR DISPLAYING DISORDERED LOCATIONS OF LIGHTING FIXTURES AND METHOD OF COLLECTING INFORMATION OF THE DISORDERS

[76] Inventor: Hee H. Bae, 228-1 Sangsam-Ri Bogae-Myoen Ansung-Kun, Kyungki-Do, Rep. of Korea

[21] Appl. No.: 768,522

[22] PCT Filed: Jan. 28, 1991

[86] PCT No.: PCT/KR91/00001
  § 371 Date: Oct. 7, 1991
  § 102(e) Date: Oct. 7, 1991

[87] PCT Pub. No.: WO91/12704
  PCT Pub. Date: Aug. 22, 1991

[30] Foreign Application Priority Data

Feb. 6, 1990 [KR] Rep. of Korea .................. 90-1387

[51] Int. Cl.⁵ .............................................. G01B 7/00
[52] U.S. Cl. ........................... 364/551.01; 340/310.01
[58] Field of Search ................... 340/310 A, 310 R; 364/550, 551.01

[56] References Cited

U.S. PATENT DOCUMENTS

| | | | |
|---|---|---|---|
| 4,040,046 | 8/1977 | Long et al. | 340/310 A |
| 4,210,901 | 7/1980 | Whyte et al. | 340/310 R |
| 4,556,865 | 12/1985 | Fukagawa et al. | 340/310 A |
| 4,611,274 | 9/1986 | Machino | 340/310 R |
| 4,633,218 | 12/1986 | Palsgrove et al. | 340/310 A |
| 4,962,496 | 10/1990 | Vercellotti | 340/310 A |
| 4,988,988 | 1/1991 | Kimura | 340/310 R |

*Primary Examiner*—Kevin J. Teska
*Assistant Examiner*—Thomas Peeso
*Attorney, Agent, or Firm*—Low & Low

[57] ABSTRACT

A method of collecting the information on defects of distributed lighting fixtures (especially discharge lamp turn-on circuits) and dividing it into categories such as defects of power sources, defects of stabilizers, and lamp defects by using a central control processor. A centralized device is also provided for each unit lighting fixture, and defect data detected by the unit defect detector is converted into a digital signal and sent to a central control processor through the existing lighting fixture power lines. The central control processor collects, stores and displays defect data from the individual defect detectors at time intervals.

7 Claims, 5 Drawing Sheets

CENTRALIZED APPARATUS FOR DISPLAYING DISORDERED LOCATIONS OF LIGHTING FIXTURES AND METHOD OF COLLECTING INFORMATION OF THE DISORDERS

FIELD OF THE INVENTION

The present invention relates to a centralized apparatus for displaying disordered locations of lighting fixtures and a method of collecting information on the nature of the disorders, and more particularly to an apparatus in which disorders occurring in discharge lamps (such as street lamps) installed at disperse locations can be checked by means of a central control unit.

BACKGROUND OF THE INVENTION

Generally hundreds and thousands of street lamps are installed in such a manner that they can be controlled by a central control processor. However, if the state of operation of a street lamp is to be checked, the actual site of the street lamp has to be visited to confirm the operative state of the street lamp, with the result that too much of the time is consumed.

Further, if a large number of street lamps are to be repaired, large quantities of lamps and ballast coils have to be loaded and carried by a vehicle, and therefore, the repairing team contributes to traffic congestion. At present there are disorder display devices installed at the lower portions of electric poles, but their functions are restricted to displaying power source disorders, ballast coil disorders, lamp disorders and the like. A detailed description of this matter is found in Korean Utility Model Publication No. 89-3957.

SUMMARY OF THE INVENTION

Therefore it is an object of the present invention to provide a disorder location displaying apparatus and a method of collecting information on such disorders, in which tens and hundreds of street lamps can be checked as to their operational state from a central unit such that the defective lamp may be visited and repaired, thereby providing a solution to the above described problem present in the conventional art.

According to the apparatus of the present invention, tens and hundreds of street lamps can be checked with regard to power source disorders, lamp disorders, ballast coil disorders and the like from a single central checking unit.

In achieving the above object, the disorder location displaying apparatus according to the present invention includes:

a plurality of unit disorder detectors for detecting a disordered state in the power source, ballast coil, discharge lamp and the like, and for transmitting the detected data to a central control processor;

a plurality of coupling means for coupling the unit disorder detectors in such a manner as to enable communications based on a frequency other than the power source frequency;

another coupling means for coupling the power line with the central control processor;

a central control processor for collecting and memorizing in a sequence the disorder information detected by the unit disorder detectors through bilateral communications; and a disorder display connected to the central control processor in such a manner as to visibly display the stored disorder information based on the command of the operator.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

The preferred embodiment of the present invention will be described in detail with reference to the attached drawings.

Figure 1:
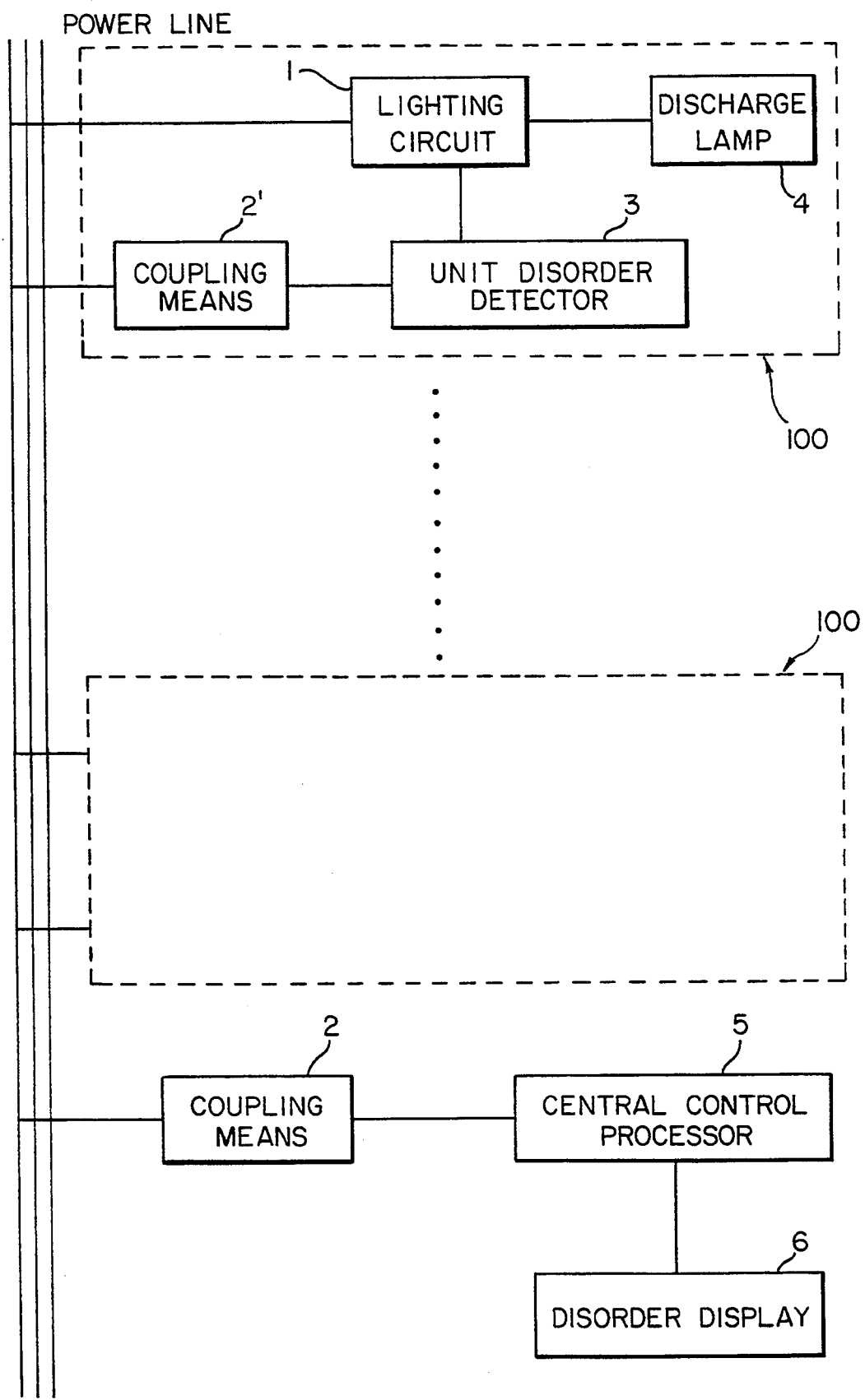
FIG. 1 is a block diagram showing the constitution of the centralized disorder displaying apparatus for lighting fixtures according to the present invention.

FIG. 1 is a block diagram showing the constitution of the centralized order displaying apparatus or lighting fixtures according to the present invention.

As shown in this drawing, a unit control section 100 constitutes a discharge lamp 4 connected through a lighting circuit 1 to a power line, and with the lighting circuit 1 connected through a unit disorder detector 3 and a coupling means 2' to the power line.

For example, 40 to 150 units of the unit control sections 100 are connected to the power line. The power line is connected through the coupling means 2 to a central control processor 5, and this central control processor 5 is connected to a disorder display 6.

The device of FIG. 1 constituted as above will now be described as to its operations.

If AC power is supplied to the power line, the discharge lamps, e.g., in the number of 150, are lighted by the help of the lighting circuit 1. Under this condition, if a disorder occurs in the AC power source, the lighting circuit 1, or the discharge lamp 4, then the disorder is detected by the unit disorder detector 3, and the detected data are transmitted through the coupling means 2'.

The transmitted disorder information is transferred through the coupling means 2 to the central control unit 5 to be stored there, and, upon request by the operator, the information is displayed on the disorder display 6.

Figure 2:
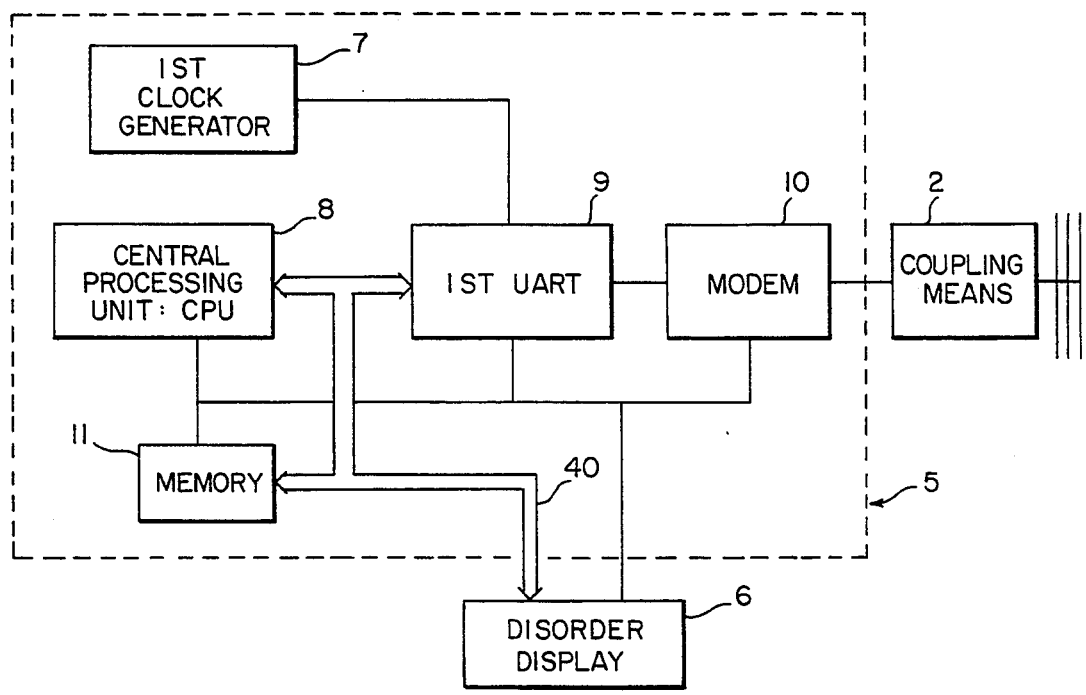
FIG. 2 is a block diagram showing the constitution of the central control processor of FIG. 1.

FIG. 2 is a block diagram showing the constitution of the central control unit 5 of FIG. 1. As shown in this drawing, a central processing unit (CPU) 8 is connected in such a manner as to transmit and receive data to and from the disorder display 6, a memory 11 and a first UART 9 (first transmitting/receiving section) which is for converting parallel data to serial data. Further, the first UART 9 is connected to a first clock generating section 7, and also connected through a modem section 10 and the coupling means 2 to the power line. Further, the central processing unit 8 is constituted such that it can control the memory 11, the transmitting/receiving section 9, the modem section 10 and the disorder display 6.

The device of FIG. 2 constituted as above will now be described as to its operations.

The central processing unit 8 generates, for example, 150 parallel address signals, and these parallel address signals are converted by the first clock generator 7 of the first UART 9 into serial address signals. Then the serial address signals are modulated by the modem section 10, and then, are supplied in the form of address signals through the coupling means 2 to, e.g., 150 unit control sections 100. Then, if the unit control section 100 finds that any one of the 150 address signals corresponds with its inherent address, then the disorder signals are outputted. These disorder signals (serial data signals) are filtered off of the AC frequency (e.g. 60 Hz) by the coupling means 2, and then, are supplied to the first UART 9 after being demodulated by the modem section 10.

The first UART 9 converts the incoming serial data signals into parallel data signals before sending them to the central processing unit 8. Based on the received signals, the central processing unit judges as to the existence or absence of a disorder, and if it is found that there is a disorder, then the signals are stored into the memory 11 as a disorder data, before being displayed on the disorder display 6 by manipulation of the display by the operator.

Figure 3:
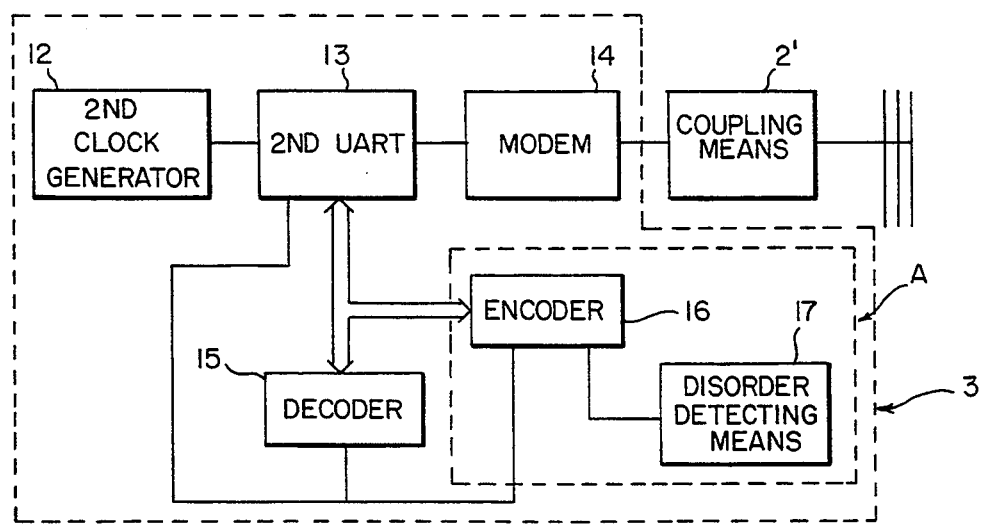
FIG. 3 is a block diagram showing the constitution of the unit disorder detector of FIG. 1.

FIG. 3 is a block diagram showing the constitution of the unit disorder detector of FIG. 1. As shown in this drawing, a second UART 13 (second transmitting-/receiving section), with a second clock generator 12 connected thereto, is connected through a modem section 14 and a coupling means 2' to the power line.

The second UART 13 is connected through an encoder 16 to a disorder detecting means 17 on the one hand, and also connected on the other hand to a decoder 15 which is capable of recognizing as to whether it corresponds with its inherent address signals. The output terminal of the decoder 15 is connected to the encoder 16 and the second UART 13.

The device of FIG. 3 constituted as above will now be described as to its operations.

The modulated serial address signals which are outputted from the device of FIG. 2 are deprived of the power source frequency during the pass through the coupling means 2', and are demodulated by the modem section 14. Then the signals are converted to parallel data signals by the transmitting/receiving section 13, before being supplied to the decoder 15.

The decoder 15 discriminates as to whether the inputted data signals correspond with its own inherent address, and, if any correspondence is encountered, the transmitting/receiving section 13 is shifted to a transmitting mode, while the encoder 16 is enabled.

If the encoder 16 is enabled, then the disorder information of the disorder detecting means 17 is encoded by the encoder 16, and then, the signals are converted to a parallel data signals by the transmitting/receiving section 13.

These parallel data signals are modulated by the modem section 14, and outputted through the coupling means 2' to the central processing unit 5 of FIG. 1.

Figure 4:
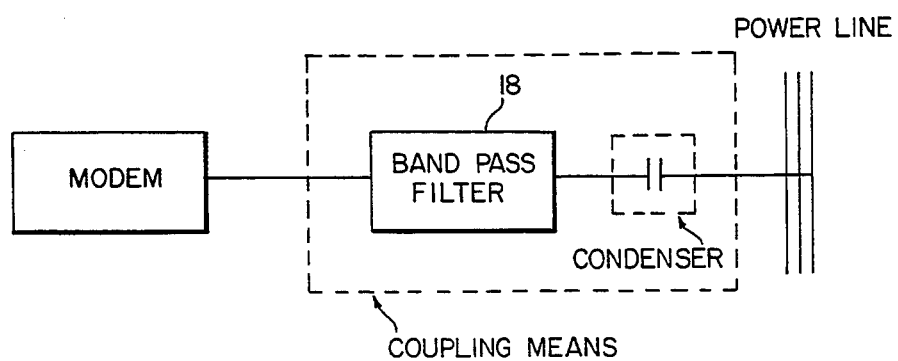
FIG. 4 is a block diagram showing the constitution of the coupling means of FIG. 1.

FIG. 4 is a block diagram showing the constitution of the coupling means (2,2') of FIG. 1, and, as shown in this drawing, this device includes a high voltage inhibiting capacitor C and a band pass filter 18 for filtering off the AC frequency of the power line.

Figure 5:
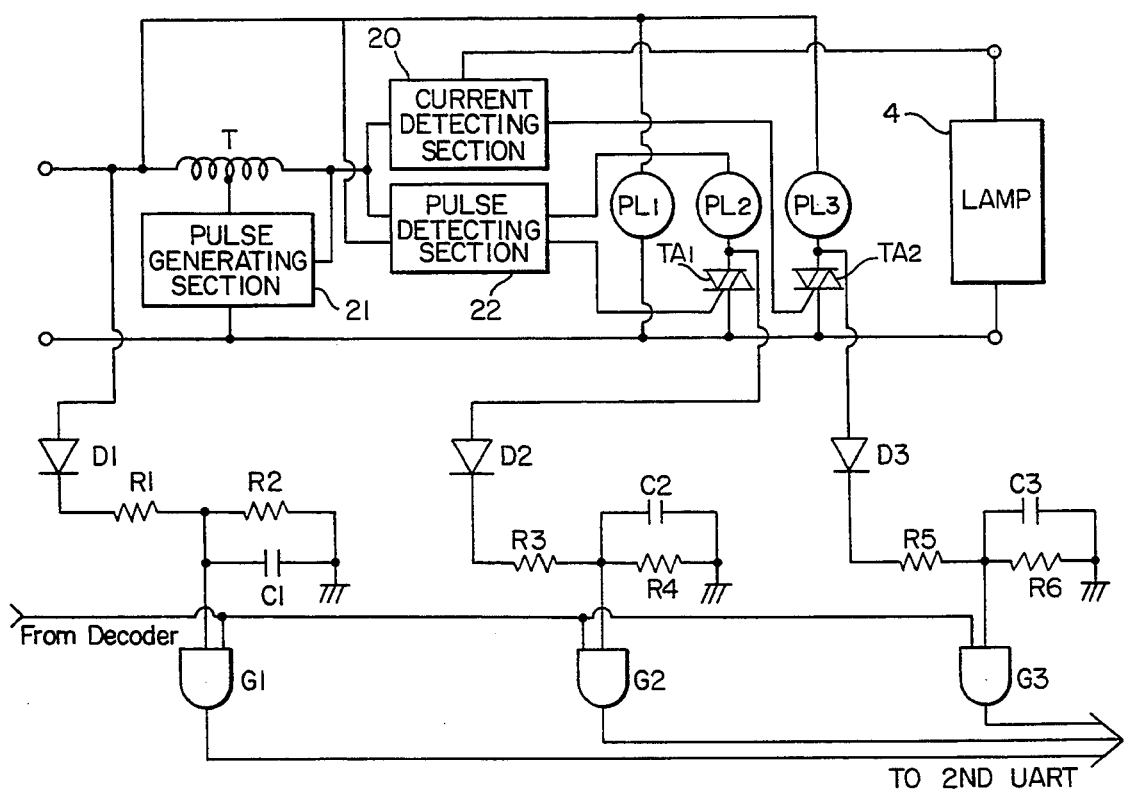
FIG. 5 is a detailed circuital illustration of the block A of FIG. 3.

FIG. 5 is a detailed circuital illustration of the block A of FIG. 3.

One of the terminals of the AC power source is connected through a ballast coil T and a current detecting section 20 to one of the terminals of the discharge lamp 4, and the other terminal of the AC power source is connected to the other terminal of the discharge lamp 4 and is also connected to a pulse generating section 21 to an intermediate tap terminal of the ballast coil T.

Meanwhile, between the terminals of the AC power source, there is connected a light emitting device such as a pilot lamp $P_{L1}$, and there are also connected in series another pilot lamp $P_{L3}$ and a triac $TA_2$.

Meanwhile, the terminal of the ballast coil T, which is disposed opposite to the power source, is connected to the output terminals of the pulse generating section 21, a pulse detecting section 22 and the current detecting section 20. Further, the pilot lamp $P_{L3}$ and a triac $TA_1$ are connected through the pulse detecting section 22 to two terminals which are disposed adjacently to the power source.

Further, the output terminal of the current detecting section 20 is connected to the gate of the triac $TA_2$, and the output terminal of the pulse detecting section 22 is connected to the gate of the triac $TA_1$.

The terminal of the ballast coil T, which is disposed nearer to the power source, is grounded through a rectifying diode $D_1$ and voltage dividing resistors $R_1$, $R_2$, while the two terminals of the resistor $R_2$ which is disposed nearer to the ground are connected to a capacitor $C_1$ in parallel.

The connecting points of the resistors $R_1$ and $R_2$ are connected to an input terminal of an AND gate $G_1$, while its output terminal is connected to the transmitting/receiving section 13 of FIG. 3.

The connecting points of the triac $TA_1$ and the pilot lamp $P_{L2}$ are grounded through a rectifying diode $D_2$ and voltage dividing resistors $R_3$ and $R_4$, while the opposite ends of the resistor $R_4$ which is disposed nearer to the ground are connected to a capacitor in parallel.

The connecting points of the resistors $R_3$ and $R_4$ are connected to an input terminal of an AND gate $G_2$, while its output terminal is connected to the transmitting/receiving section 13 of FIG. 3.

The connecting points of the triac $TA_2$ and the pilot lamp $P_{L3}$ are grounded through a rectifying diode $D_3$ and voltage dividing resistors $R_5$ and $R_6$, while the two terminals of the resistor $R_6$ which is disposed nearer to the ground is connected to a capacitor $C_3$ in parallel.

The connecting points of the resistors $R_5$ and $R_6$ are connected to an input terminal of the AND gate $G_3$, while its output terminal is connected to the transmitting/receiving section 13 of FIG. 3.

The rest of the input terminals of the AND gates $A_1$, $A_2$, $A_3$ are connected to one another, and also connected to the output side of the decoder 15 of FIG. 3.

The device of FIG. 5 constituted as above will now be described as to its operations.

If an abnormality exists in the inputted AC power, the pilot lamps $P_{L1},P_2,P_3$ are turned off, and logic signals in the form of 0, 0, 0 are inputted into one each of the input terminals of the AND gates $G_1,G_2,G_3$, with the result that signals of 0, 0, 0 are inputted into the transmitting/receiving section 13 of FIG. 2.

If the ballast coil T becomes abnormal with the AC power and the discharge lamp 4 kept in the normal state, then the pilot lamp $P_{L1}$ is lighted, and the pilot lamps $P_{L2}$ and $P_{L3}$ are turned off, with the result that logic signals in the form of 1, 1, 1 are inputted to the AND gates $G_1,G_2,G_3$, and that logic signals in the form of 1, 1, 1 are inputted into the transmitting/receiving section 13 of FIG. 3.

If the discharge lamp 4 becomes abnormal with the AC power source and the ballast coil T kept in the normal state, then the pilot lamps $P_{L1},P_{L2}$ are turned on, and the pilot lamp $P_{L3}$ is turned off, with the result that logic signals of 1, 0, 1 are inputted into the AND gates $G_1,G_2,G_3$, and that logic signals of 1, 0, 1 are inputted into the transmitting/receiving section 13.

If the ballast coil T, the AC power source and the discharge lamp 4 are all in the normal state, the pilot lamp $P_{L2}$ is turned off, and the pilot lamps $P_{L1}.P_{L3}$ are turned on, with the result that logic signals of 1, 1, 0 are inputted into the AND gates $G_1,G_2,G_3$, and that logic signals of 1, 1, 0 are inputted into the transmitting-/receiving section 13.

Figure 6:
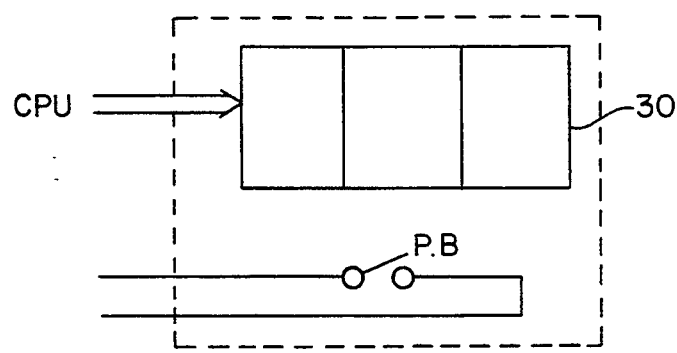
FIG. 6 is a circuital illustration of the disorder display of FIG. 1.

FIG. 6 is a detailed circuital illustration of the disorder display 6 of FIG. 1, and, as shown in this drawing, the display includes: a display panel 30 consisting of an LED device; and a push button switch SW. If the push button switch SW is pressed, the information stored in the memory is displayed on the display panel.

Figure 7:
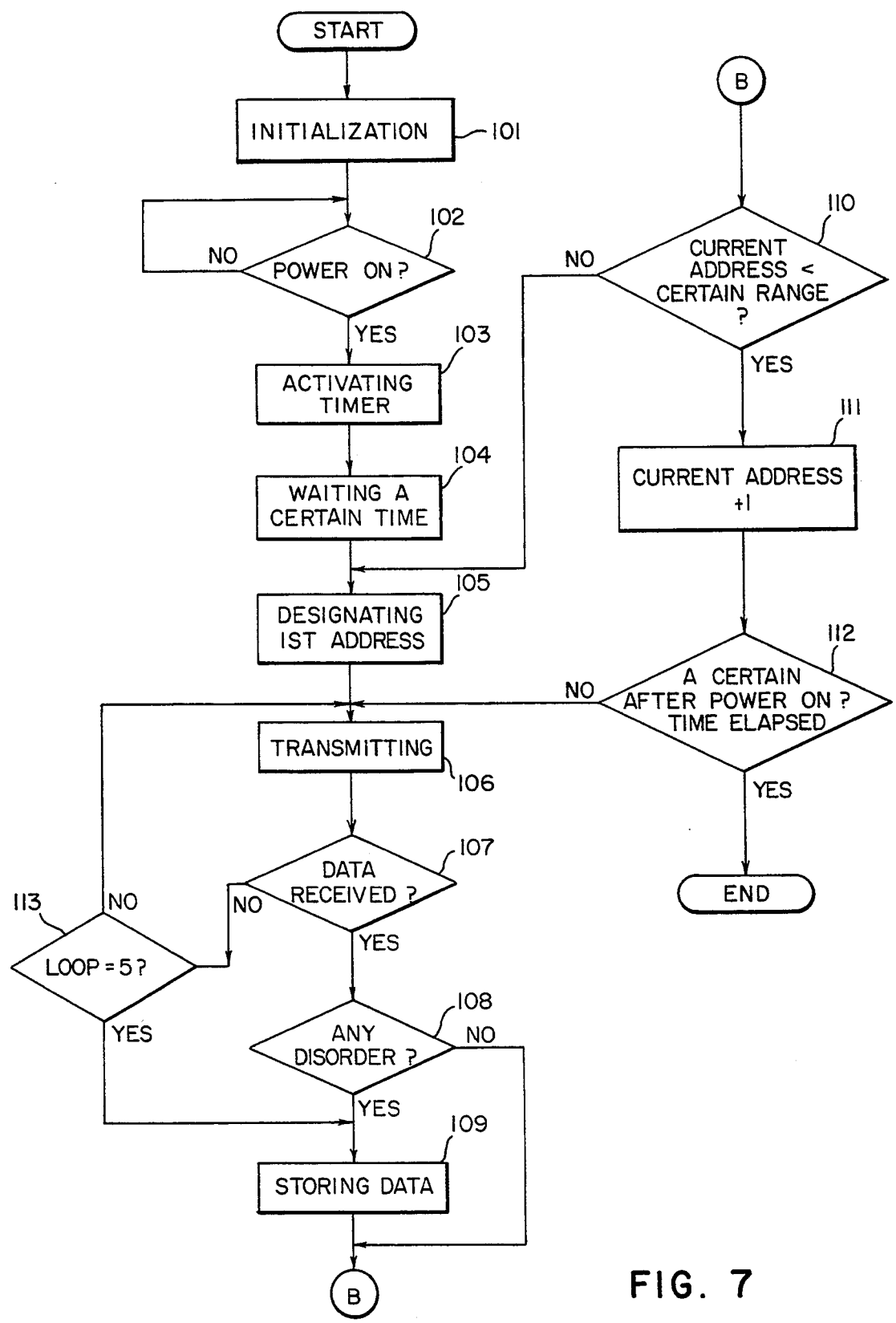
FIG. 7 is a flow chart showing the operation of the device of FIG. 2.

FIG. 7 is a flow chart showing the operations of the central processing unit of FIG. 2.

After the inputting of a starting signal, the system is initialized at step 101, and the operation advances to step 102. At step 102, in accordance with the on or off state of the AC power source, the operation is returned to step 102 or advances to step 103. At step 103, a timer (consisting of hardware or software) is activated, and the operation advances to step 104. After waiting for some time at step 104, the operation advances to step 105 at which the first address number is designated, and then, the operation advances to step 106.

At step 106, the number which is designated at step 105 is transmitted, and then, the operation advances to step 107. At step 107, in accordance with the existence or absence of the received data, if "no" the operation advances to step 113, while, if "yes", the operation advances to step 108. At step 113, if feed-backs to step 106 are repeated 5 times at step 107, the operation returns to step 109.

At step 108, a discrimination is made as to whether there is included a disorder signal in the received signals, and if yes, the operation advances to step 109 at which the disorder information is memorized before advancing to step 110, while, if no, the operation advances directly to step 110.

At step 110, a judgement is made as to whether the current address number comes within a certain range, and, if no, the operation returns to step 105, while, if yes, the operation advances to step 111.

At step 111, "1" is added to the current address number before advancing to step 112. At step 112, the AC power is turned on, and, in accordance with the elapsing of a certain period of time, if yes, the operation is terminated, while, if no, the operation returns to step 106.

The disorder information which is stored in the above described manner can be displayed on the display panel 6 as to the district number of the disordered street lamp and the type of the disorder, by pressing the push button of the display panel 6 once for each case.

Figure 8:
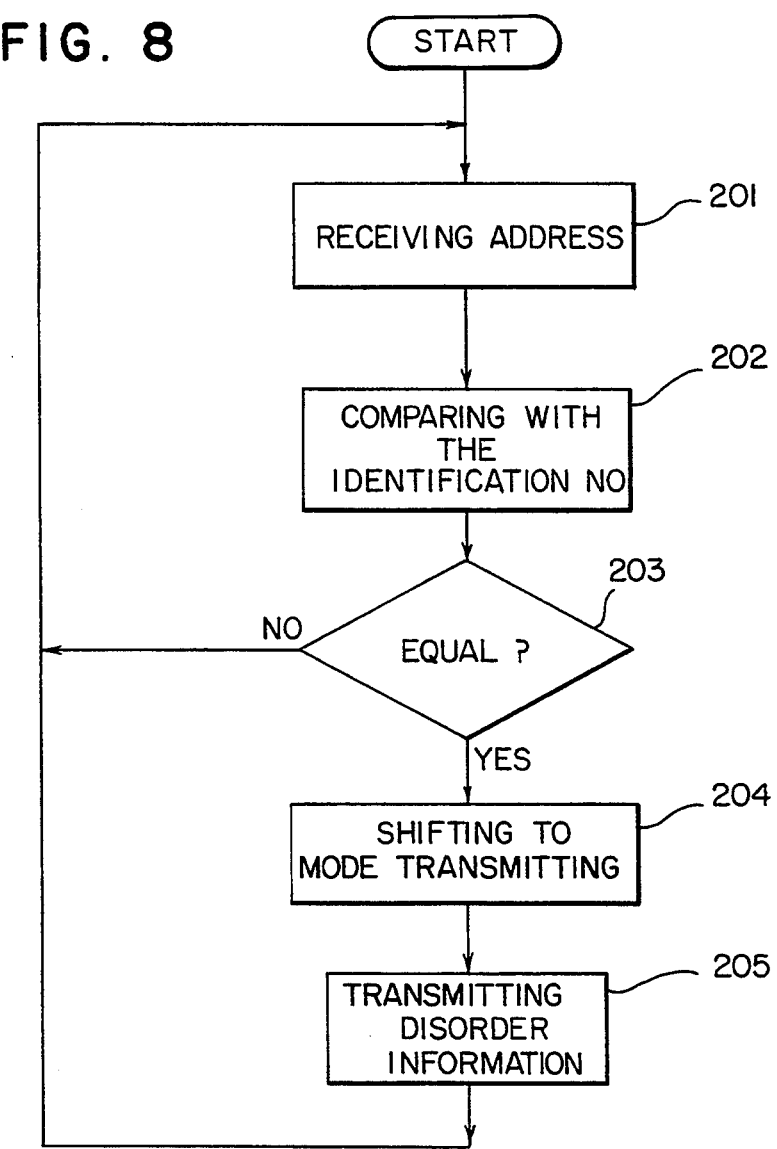
FIG. 8 is a flow chart showing the operation of the device of FIG. 3.

FIG. 8 is a flow chart showing the operation of the device of FIG. 3.

After inputting of a start signal, address signals are received at step 201, and the operation advances to step 202 at which the received address is compared with its own inherent address before advancing to step 203.

If a correspondence is seen upon comparison at step 202, the operation advances from step 203 to step 204, while, if no correspondence is seen, the operation returns to step 201.

At step 204, a shifting to a transmitting mode is made, and then, the operation advances to step 205 at which disorder information is received before advancing to step 201.

The overall operation of the system is carried out in the manner described below.

After turning-on of the power source for the discharge lamps, the central processing unit waits for several minutes or several scores of minutes (because the discharge lamps are not put to a normal state after first turning on the power source), and then, the central processing unit designates first the unit disorder detector number (electric pole number or address). The designated number is loaded to a data bus 40 (FIG. 2), then the first UART (which can be a universal asynchronous receiver and transmitters or "UART" a commercially available chip) converts the parallel signals to serial signals under an asynchronizing mode and under the control of a clock from the first clock generating section. Then the modem section modulates the signals into ones which are most suitable for the power line.

The modulated high frequency signals are transferred to the power line through the coupling means which includes a band pass filter for passing high frequency signals. The signals, which are loaded on the power line pass through the coupling means, are converted to serial digital signals by the modem section, before being supplied to the second UART.

The second UART converts the digital signals of the modem section to parallel signals to send them to the decoder, and the decoder checks as to whether they correspond with the address of the decoder, and, if equal or matched, then the decoder outputs a signal so that the second UART is shifted to a transmitting mode, as well as enabling the encoder.

The encoder is placed in a state in which it is furnished with data on the abnormalities or normalities of the power source, the ballast coil and the discharge lamp, and in this state, if the encoder receives an enable signal from the decoder, then the encoder sends the disorder information to the second UART. The second UART converts the disorder information data into a serial data, and transmits them through the modem section, the coupling means and the power line to the central processing unit.

Within the central control processor, the disorder data which are inputted through the power line are sent through the coupling means the modem section and the first UART to the central processing unit. The central processing unit discriminates as to whether the incoming data are a disorder information or not, and, if it is a disorder information, it is stored in the memory.

The central control processor carries out the above described process for .the respective unit disorder detectors (unit controllers), and, after a certain period of time has elapsed, the disorder data collecting operation is terminated.

If the checking person presses the push button of the disorder display in order to check on the existence of any disorders, then the central processing unit recognizes it, and displays the first stored disorder case as to its unit disorder detector number and the type of the disorder in decimal numbers.

If the checking person presses the push button again after confirming on it, the next disorder data is displayed in the same manner.

Meanwhile, in the case where the unit disorder detector is out of order or the communication is disabled, if no data are received after transmitting a designated address, the transmitting/receiving operation is repeated 4 times, and, on the fifth trial, the unit disorder detector is memorized as being out of order.

The disorder display of FIG. 6 is not only capable of displaying at least 3 digits of decimal numbers, but also the encoder of FIG. 5 can be constituted in various forms.

Further, the disorder detecting means can be operated in various detecting methods such as current converting method, voltage stepping-down method and the like in detecting the abnormality of the glow discharge state. Further, in the above embodiment, the disorder detecting means for the ballast coil is operated in the form of detecting the generation of pulses, but it can also be constituted in the form of detecting the variation of the voltage.

Further, the first and second UART can be constituted using the Motorola chip ACIA (asynchronous communications interface adapter) which communicates by digitalizing parallel data based on the asynchronizing method. But it can be constituted by means of other chips having the same functions, and it can also be constituted by forming digital circuit one by one.

According to the present invention as described above, widely dispersed disorder cases can be checked at a centralized position, with the result that man hours and equipment can be saved.

What is claimed is:

1. A centralized disorder displaying apparatus for lighting fixtures and for a lighting circuit including power lines and a plurality of discharge lamps, the apparatus comprising:
 a plurality of lighting unit disorder detectors connected to said lighting circuit in such a manner as to detect disorder state in the power supply voltage, ballast coil and discharge lamp, and to communicate detected disorder data to a central control processor;
 a plurality of coupling means for coupling said unit disorder detectors with said power line in such a manner as to communicate with a frequency other than the frequency of said power line;
 another coupling means for coupling said power line with said central control processor;
 said central control processor having means for sequentially collecting and memorizing said disorder data detected by said unit disorder detectors through bilateral communications; and
 a disorder display connected to said central control processor in such a manner as to visually display the memorized disorder data based on the display command inputted by the operator,
 (a) said central control processor means including:
  a central processing unit (CPU);
  a first transmitting/receiving section (UART) for converting the data of said CPU and the data of said unit disorder detectors from parallel signals to serial signals and from serial signals to parallel signals;
  a first clock signal generator for supplying clock signals to said first transmitting/receiving section;
  a modem section for modulating and demodulating the serial signals of said first transmitting/receiving section and the signals of said unit disorder detectors; and
  a memory for storing the disorder data; and,
 (b) each said lighting unit disorder detector including:
  a disorder detecting means connected to said lighting circuit in such a manner as to generate disorder signals for respective types of disorders;
  an encoder for converting the disorder signals or said disorder detecting means to digital signals before supplying them to a second transmitting/receiving section;
  a decoder for supplying control signals to said encoder and to said second transmitting/receiving section after decoding the data signals from said second transmitting/receiving section;
  said second transmitting/receiving section being for converting serial signals of said CPU to parallel signals before sending them to said decoder, and for converting parallel signals of said encoder to serial signals before sending them to said CPU;
  a second clock generator for supplying to said second transmitting/receiving section clock signals having a frequency similar to that of the clock signals of said first transmitting/receiving section of said central control processor;
  a modem for modulating the serial signals of said second transmitting/receiving section, and for demodulating the signals of said CPU;
  a power source voltage detecting section and pilot lamps thereof for detecting the power source voltage;
  a pulse detecting section and pilot lamps thereof for detecting as to the existence or absence of pulse generations; and,
  a current detecting section and pilot lamps thereof for detecting the current flow through discharge lamps.

2. The centralized disorder displaying apparatus as claimed in claim 1 wherein said encoder comprises:
 three rectifying diodes connected respectively to said power source voltage detecting pilot lamps, said pulse detecting section, and said current detecting section, in such a manner as to rectify the AC voltages of the signals to DC signals;
 three sets of voltage dividing resistors $R_1$-$R_6$ connected between the respective DC output terminals of said three rectifying diodes and the ground, and each set respectively consisting of two resistors for dividing the voltage;
 a plurality of condensers $C_1$-$C_3$ connected to the lower voltage side resistance devices of said respective voltage dividing resistors in such a manner as to flatten the DC current;
 three AND gates for outputting output signals to said second transmitting/receiving section, after receipt of the DC signals (flattened by said condensers) through their input terminals, and after receipt of control signals from said decoder through their other input terminals.

3. A centralized disorder displaying apparatus for lighting fixtures and for a lighting circuit including power lines and a plurality of discharge lamps, the apparatus comprising:
a plurality of lighting unit disorder detectors connected to said lighting circuit in such a manner as to detect disorder state in the power supply voltage, ballast coil and discharge lamp, and to communicate detected disorder data to a central control processor;
a plurality of coupling means for coupling said unit disorder detectors with said power line in such a manner as to communicate with a frequency other than the frequency of said power line;
another coupling means for coupling said power line with said central control processor;
said central control processor having means for sequentially collecting and memorizing said disorder data detected by said unit disorder detectors through bilateral communications; and
a disorder display connected to said central control processor in such a manner as to visually display the memorized disorder data based on the display command inputted by the operator,
said disorder display having:
three LED display devices for displaying the disorder data of said CPU in decimal numbers; and
a push button switch for sending display command signals to said CPU.

4. A disorder information collecting method for lighting fixtures and for a lighting circuit, including a central control processor, and a plurality of unit disorder detectors, and using the power lines as the communication lines in collecting disorder data from a discharge lamp circuit, the method carried out by the central control processor comprising:
1) step of waiting for several minutes after turning on the power of said discharge lamps;
2) step of designating a unit disorder detector number;
3) step of transmitting said disorder detector number to said power line;
4) step of receiving data after transmitting signals;
5) step of discriminating as to the existence or absence of a disorder upon finding a received data, and storing the unit disorder detector number and the disorder type into a memory upon finding a disorder;
6) step of transmitting/receiving the same number 4 times upon finding none of received data, and storing the data as a disorder information at the fifth trial;
7) step of by-passing the disorder data storing step upon finding none of disorders after decoding the received data;
8) step of returning to the initial number designating step upon finding non-falling of the current number within a certain range, and incrementing "1" to the current number upon finding a falling of the current number within the certain range; and
9) step of judging as to the elapsing of a certain time period after the waiting step, terminating the operation upon finding the elapsing of the certain time period, and returning to step 3 upon finding non-elapsing of the certain time period.

5. The disorder information collecting method as claimed in claim 4, further comprising: a step in which, after step 3, said unit disorder detector decodes the designated numbers appearing in the power line continuously; if a number which corresponds with the ID number of said unit disorder detector is encountered, the operation is shifted to a transmitting mode; a disorder information is transmitted; and then, the operation of decoding the designated numbers is resumed.

6. A lighting fixture disorder detecting and displaying apparatus for detecting a disorder state in the operation of a discharge lamp among a plurality of dispersed discharge lamps connected to a power line for supplying AC power and for displaying the location of said disordered state discharge lamp and said disorder state for each discharge lamp having a disordered state, the apparatus comprising:
a unit disorder detector (3) for each discharge lamp with each unit disorder detector being connected to a lighting circuit of each said discharge lamp in such a manner as to detect a disorder state in the power supply voltage, ballast coil and discharge lamp, and to communicate said detected disorder state to a central control processor (5);
said central control processor sequentially collecting and memorizing said detected disorder state detected by each said unit disorder detector through communicating with said unit disorder detector with said central control processor including a central processing unit (CPU) (8); a first transmitting/receiving section (UART) (9) for converting a signal of said CPU and a signal of said unit disorder detectors from a parallel signal to a serial signal or from a serial signal to a parallel signal; a first clock signal generator (7) for supplying clock signals to said first transmitting/receiving section (9); a modem section (10) for modulating said serial signals of said first transmitting/receiving section and demodulating said serial signals of said unit disorder detectors (3); and a memory for storing said detected disorder state for each disordered discharge lamp;
said unit disorder detector further including a disorder detecting means (17) connected to said lighting circuit in such a manner as to generate disorder signals for said detected disorder state; an encoder for converting said disorder signals of said disorder detecting means to digital signals before supplying said signals to a second transmitting/receiving section; a decoder for supplying control signals to said encoder and to said second transmitting/receiving section after decoding the signals from second transmitting/receiving section; said second transmitting/receiving section for converting serial signals to parallel signals before sending them to said decoder, and for converting parallel signals of said encoder to serial signals before sending them to said CPU; a second clock signal generator for supplying to said second transmitting/receiving section clock signals having a frequency similar to that of the clock signals of said first transmitting-/receiving section of said central control processor; and a modem for modulating said serial signal of said second transmitting/receiving section, and for demodulating the signals of said CPU;
a first coupling means for each said unit disorder detector for coupling each said unit disorder detector with said power line and for receiving said detected disorder state from said unit disorder detector and for communicating said detected disorder state by generating a frequency other than a frequency of said AC power conveyed by said power line;

a second coupling means for coupling said power line to said central control processor (5) to enable said central control processor to receive said detected disorder state data via said power line from each said unit disorder detector;

said first and said second coupling means includes a condenser for inhibiting high voltages within said AC power frequency; and a band pass filter for passing only frequencies falling within a range other than the frequency range of said AC power frequency;

a disorder display for visually displaying said memorized disorder state data and said location of said disordered discharge lamp wherein said disorder display includes LED display devices for displaying said disorder data of said CPU in decimal numbers; and a switch for sending display command signals to said CPU to initiate said disorder display.

7. The apparatus of claim 6 wherein said disorder detecting means (17) includes a power source voltage detecting section having a pilot lamp for visually indicating the state of said AC power voltage at said location of said discharge lamp;

a pulse detecting section for detecting a disorder of a pulse generating section and having a pilot lamp for visually indicating the state of said ballast coil and pulse generating section;

a current detecting section for detecting the current flow through discharge lamp and having a pilot lamp for visually indicating the state of said discharge lamp; and said encoder includes three rectifying diodes connected respectively to said power source voltage detecting section, said pulse detecting section and said current detecting section in such a manner as to rectify the AC voltage signals to DC voltage signals;

a pair of resistors connected in series from each said rectifying diode to the ground for dividing said DC voltage signals, respectively, and having a lower voltage side;

a condenser connected in parallel to each said lower voltage side of said pair of voltage dividing resistors in such a manner as to provide a constant DC voltage; and an AND gate connected to receive each said constant DC voltage provided by each said condenser, respectively, and to receive control signals from said decoder through its input terminals for outputting output signals to said second transmitting/receiving section.

* * * * *